UNITED STATES PATENT OFFICE.

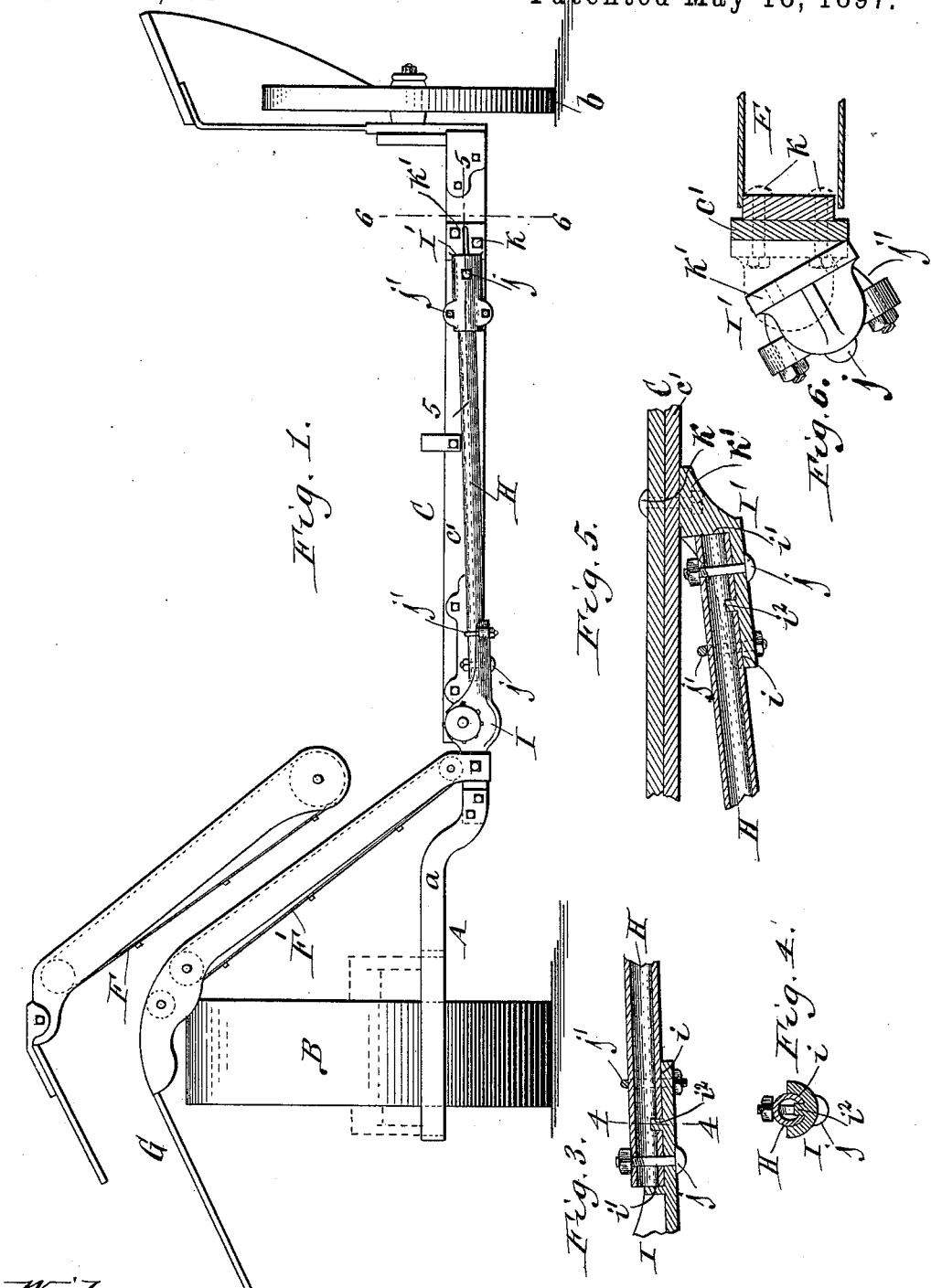

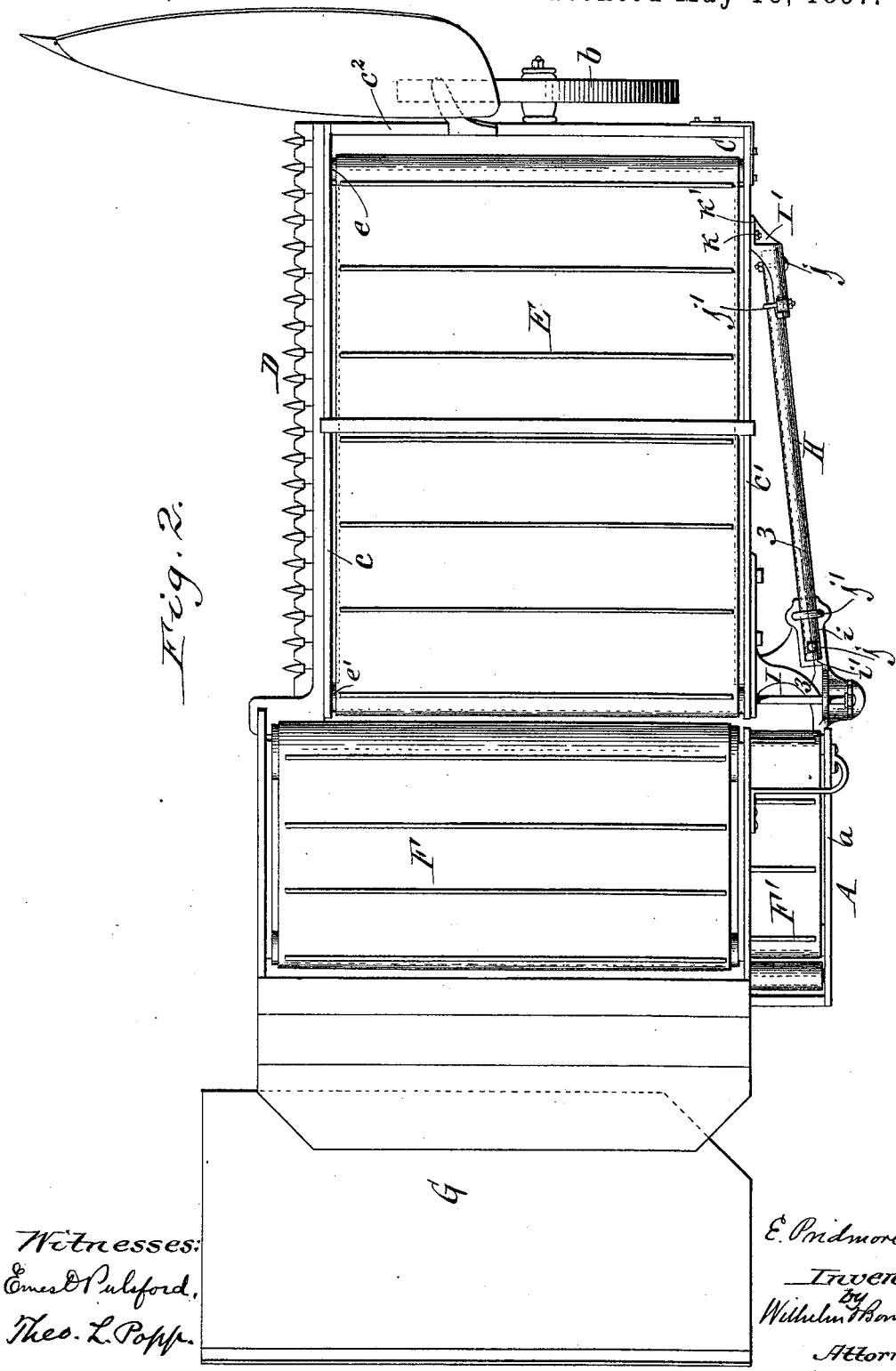

EDWARD PRIDMORE, OF BATAVIA, NEW YORK, ASSIGNOR TO THE JOHNSTON HARVESTER COMPANY, OF SAME PLACE.

HARVESTER.

SPECIFICATION forming part of Letters Patent No. 582,798, dated May 18, 1897.

Application filed June 6, 1896. Serial No. 594,505. (No model.)

*To all whom it may concern:*

Be it known that I, EDWARD PRIDMORE, a citizen of the United States, residing at Batavia, in the county of Genesee and State of New York, have invented a new and useful Improvement in Harvesters, of which the following is a specification.

This invention relates to grain-harvesters in which the cut grain drops upon a platform arranged in rear of the cutter mechanism and is conveyed from the platform to the binder mechanism for tying the grain into bundles.

As heretofore constructed, the platform was very flexible and vibrated excessively on account of insufficient support for the outer portion of the platform, which permits the cutter to be depressed considerably out of its normal position, thereby cutting the grain irregularly and rendering the cutter liable to be injured.

The object of my invention is to provide simple and reliable means for stiffening the platform and preventing the same from vibrating unduly, so as to avoid injury to the cutter mechanism.

In the accompanying drawings, consisting of two sheets, Figure 1 is a fragmentary rear elevation of a grain-harvester provided with my improvements. Fig. 2 is a top plan view of the same. Fig. 3 is a vertical longitudinal section, on an enlarged scale, in line 3 3, Fig. 2. Fig. 4 is a cross-section in line 4 4, Fig. 3. Fig. 5 is a horizontal section, on an enlarged scale, in line 5 5, Fig. 1. Fig. 6 is a vertical cross-section, on an enlarged scale, in line 6 6, Fig. 1, showing the manner of applying the outer bracket of the strengthening-brace to the platform-frame.

Like letters of reference refer to like parts in the several figures.

A represents the main frame of the harvester, which is supported by the master or drive wheel B, and C is the platform-frame, which is supported at its outer end by the grainward-wheel $b$ and connected at its inner end with the main frame. The platform-frame consists, essentially, of front and rear bars $c$ $c'$, which project laterally from the grainward side of the main frame, and a cross-bar $c^2$, connecting the outer or grainward ends of the front and rear platform-bars.

D is the cutter mechanism, arranged along the front end of the platform-frame, and E is the horizontal platform conveyer or apron, whereby the cut grain is carried from the grainward to the stubbleward end of the platform and which passes around receiving and delivery rollers $e$ $e'$, journaled, respectively, on the outer and inner portions of the platform-frame.

F F' are the upper and lower aprons of the elevator, whereby the grain is carried from the delivery end of the platform conveyer to the elevated binder-deck G.

H represents a stiffening-bar whereby the platform is rendered more rigid and capable of resisting any tendency to rock or deflect the outer portion thereof. This bar is preferably of tubular form and arranged obliquely adjacent to the rear bar $c'$ of the platform-frame, with its inner end arranged farther from the rear bar than its outer end. The ends of the stiffening-bar are secured to the rear bar of the platform-frame as follows:

I I' represent inner and outer brackets whereby the inner and outer ends of the stiffening-bar are connected with the rear platform-frame bar $c'$. Each of these brackets is provided with a semicylindrical socket $i$, which receives the adjacent end of the stiffening-bar, a stop or shoulder $i'$, which bears against the end of said bar, and a pin or teat $i^2$, arranged in the socket and engaging with an opening in the side of the stiffening-bar. The latter is secured to the bracket by a bolt $j$, passing through the bar, and a clip $j'$, embracing the bar. The shoulder, pin, and bolt hold the bar against lengthwise movement in the socket of the bracket, while the pin and bolt hold the same also against turning in the socket. The inner bracket connects the inner end of the rear platform-frame bar $c'$ and the rear main-frame bar $a$, which latter is arranged back farther than the platform-frame bar $c$. The outer bracket I' is secured to the platform by bolts $k$, passing through a vertical plate $k'$, formed on the outer end of the outer bracket and the outer portion of the rear platform-frame bar. In order to counteract any force which tends to depress the front end of the platform, the stiffening-bar is fastened to the platform in a slightly-twisted condition, so as to produce a torsional strain on this bar, which constantly tends to lift the front end of the platform. This is preferably done by first securing the inner bracket to the rear bars of the main frame and the platform-frame and then securing the inner end of the stiffening-bar to the inner bracket. The outer bracket is next secured to the outer end of the stiffening-bar, so that its fastening-plate stands at an angle to the vertical rear side of the rear platform-bar, as shown in full lines, Fig. 6. The fastening-plate is now drawn against the rear vertical side of the rear platform-bar and secured thereto in a vertical position by the fastening-bolts, as shown in dotted lines, Fig. 6, thereby imparting a torsional strain to the stiffening-bar, which exerts a constant tendency to tilt the front end of the platform upwardly, thereby preventing the cutter from being drawn downwardly by lodged grain and resisting any force which tends to deflect it from its normal position.

The torsionally-strained stiffening-bar may be constructed of any material which possesses the necessary degree of resiliency—for instance, wrought-iron tubing.

I claim as my invention—

1. In a grain-harvester, the combination with the platform, of a torsionally-strained stiffening-bar, secured to the rear portion of the platform and tending with its outer end to lift the outer front portion of the platform, substantially as set forth.

2. In a grain-harvester, the combination with the platform, of a torsionally-strained tubular stiffening-bar arranged in rear of the platform, with its inner end farther back than its outer end, and brackets which are secured to the rear portion of the platform and to which the inner and outer ends of said bar are rigidly secured, substantially as set forth.

Witness my hand this 18th day of May, 1896.

EDWARD PRIDMORE.

Witnesses:
GEORGE O. VOLZ,
GEO. C. FARRALL.